United States Patent [19]

Saito et al.

[11] 4,048,642

[45] Sept. 13, 1977

[54] EXPOSURE TIME CONTROL DEVICE OF ELECTRIC SHUTTER FOR CAMERA

[75] Inventors: Takeo Saito, Yotsukaido; Youichi Seki, Chiba, both of Japan

[73] Assignee: Seiko Koki Kabushiki Kaisha, Japan

[21] Appl. No.: 550,591

[22] Filed: Feb. 18, 1975

[30] Foreign Application Priority Data

Feb. 18, 1974 Japan .................................. 49-19271

[51] Int. Cl.$^2$ ................................................ G03B 7/08
[52] U.S. Cl. .................................. 354/23 D; 354/50; 354/60 A; 354/60 L
[58] Field of Search .............. 354/23 D, 50, 51, 60 R, 354/60 A, 60 L

[56] References Cited

U.S. PATENT DOCUMENTS

| | | | |
|---|---|---|---|
| 3,677,151 | 7/1972 | Werner et al. .......................... | 354/50 |
| 3,843,249 | 10/1974 | Kitaura .............................. | 354/23 D |
| 3,876,876 | 4/1975 | Kitai et al. .......................... | 354/23 D |

OTHER PUBLICATIONS

*TTL Cookbook,* Don Lancaster, 1974, p. 208.

*Designing with TTL Integrated Circuits,* prepared by Texas Instruments Inc., 1971, p. 256.

*Primary Examiner*—Russell E. Adams
*Attorney, Agent, or Firm*—Robert E. Burns; Emmanuel J. Lobato; Bruce L. Adams

[57] ABSTRACT

An exposure time control device of an electric shutter includes a brightness-time conversion circuit for developing a single pulse having a width representative of the brightness of a scene to be photographed and a standard pulse generating circuit for generating pulses at a standard rate. A reversible counter counts the standard pulses for a period of time equal to the duration of the single pulse. Upon termination of the single pulse, a reversible counter control circuit applies control signals to the reversible counter to read-out the count stored therein for controlling the shutter exposure time. A delay circuit develops a trigger pulse upon opening of the shutter. The trigger pulse is applied to the reversible counter control circuit, and if it is applied prior to the termination of the single pulse, read-out of the count stored in the reversible counter is initiated prior to termination of the single pulse.

1 Claim, 8 Drawing Figures

EXPOSURE TIME CONTROL DEVICE OF ELECTRIC SHUTTER FOR CAMERA

BACKGROUND OF THE INVENTION

The present invention relates to improvements of an exposure time control circuit for an electric shutter for a camera using an internal photometric type digital memory reproducing system.

The exposure time control circuit for an electric shutter a camera proposed under the application No. Sho-48-95007 by the applicants is constructed so that a counting circuit is reset by the reset pulse generated from a reset pulse generating circuit composed of a mono-stable multi-vibrator connected to operate in synchronizing with a power supply after actuation of the mechanical power switch cooperative with the release button in operation, thereby allowing standard pulses to start generating from the standard pulse generating circuit by the trailing edge of this reset pulse and also actuating the brightness/time conversion circuit which generates a single pulse having a pulse duration corresponding with the brightness of a subject. The standard pulses being generated in the standard pulse generating circuit concurrently with the generation of the single pulse are delivered as inputs to the counting circuit for counting, and concurrent with the completion of the single pulse the inputs to the counting circuit are stopped thus stopping memory operation, and the system is then transfered electrically from the state capable of memorizing to that capable of calling or reading-out by the trailing edge of this single pulse. By depressing the release button more, the mirror for a view finder goes up starting exposure and simultaneously allows a trigger pulse to be generated by actuation of the timing switch interlocked with the mirror's up-going motion, and with generation of this trigger pulse, a calling of the memory value so far memorized in the counting circuit is started and a shutter-closing signal is then generated completing exposure at the end of calling.

In the system as described above, if the release button is pushed down to the full extent before completion of the single pulse in case the pulse width of single pulses generated in the brightness/time conversion circuit is long, for example, when its brightness of a subject to be photographed is low, etc., it is probable that the mirror will go up starting exposure. Since the light passed through a photographing lens will then no longer fall upon the light-receiving element, the single pulse will not come to an end in which case the system will fail to be ready for being read-out or called up. Instead, memory operation will continue and the shutter will remain open without completing exposure.

SUMMARY OF THE INVENTION

It is an object of the invention to eliminate faulty; shutter operation even when the camera is handled in an unusual way as mentioned above by comparing the completion time of the single pulse generated in the brightness/time conversion circuit with the generating time of a trigger pulse generated by actuation of a timing switch, and by operating the system to stop its memory and to transfer from the condition in which it can memorize to the condition wherein it can call up and to start calling or reading-out the memory values memorized in the counting circuit upon the occurence of either the single pulse or the trigger pulse. Thus, if the mirror goes up after completion of the single pulse to be generated in the brightness/time conversion circuit, normal exposure action is achieved. And even if the mirror goes up before completion of the single pulse, malfunction set forth above can be prevented.

A BRIEF DESCRIPTION OF REFERENCE DRAWINGS

A DETAILED DESCRIPTION OF THE INVENTION

Figure 1:
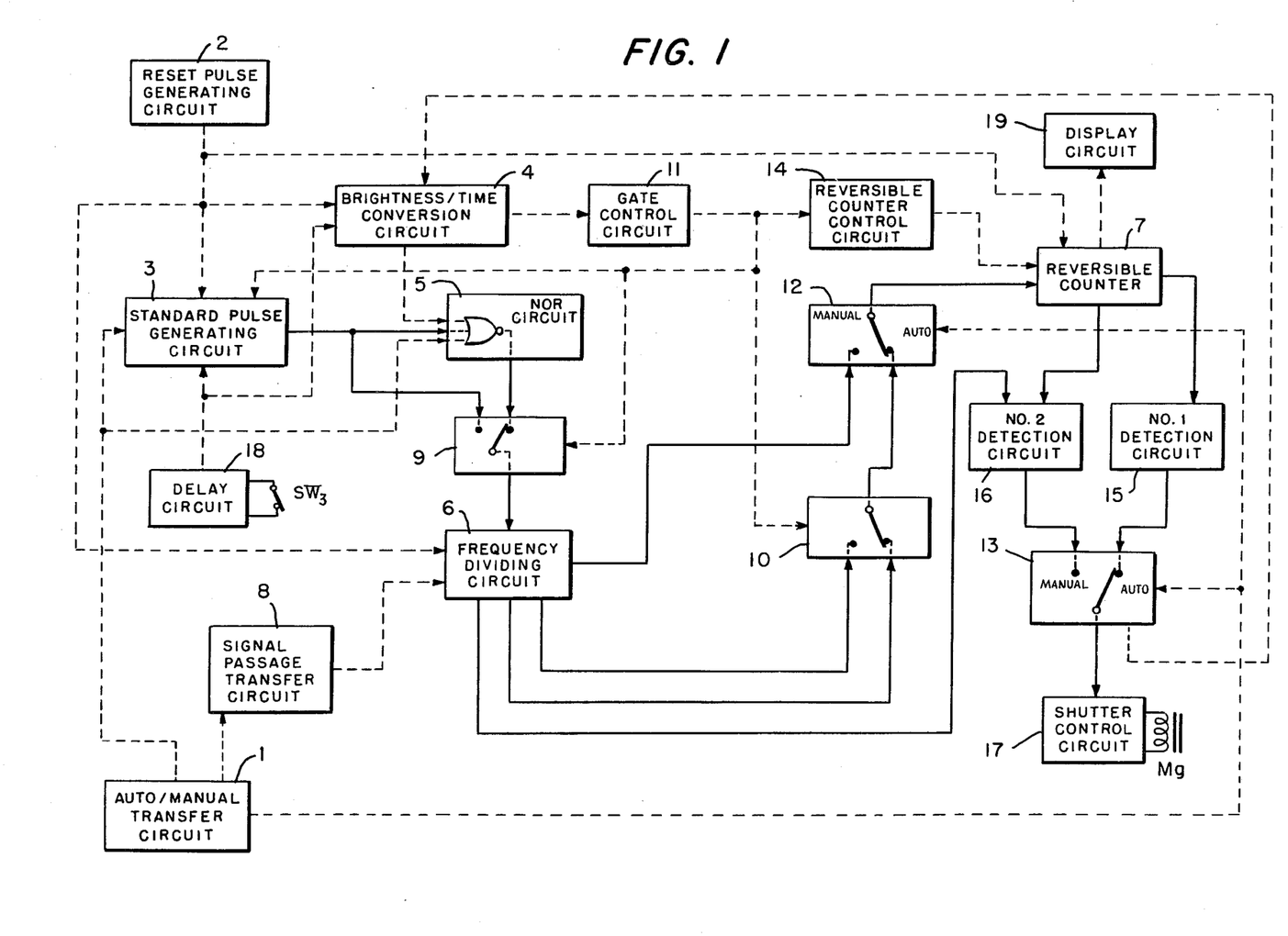
FIG. 1 is block diagram showing the composition of the present invention.

An explanation is given of the structure and operation of below an embodiment of the present invention according to the reference drawings. FIG. 1 is a block diagram showing the structure of this embodiment, in which 1 is an exposure time automatic setting or auto-/manual transfer circuit including a change-over switch for use in selecting the manual mode of setting exposure time. 2 is reset pulse generating circuit which begins to generate reset pulses in synchronism with current supply. 3 is a standard pulse generating circuit to generate the standard pulses with a definite frequency. 4 is a brightness/time conversion circuit to measure the intensity of light, passed through a photographing lens, with a photoconductive cell, i.e. Cds, thereby generating a single pulse having the pulse width corresponding to the brightness of a subject. The circuit paths represented by solid lines pass signals representative of exposure time including the standard pulses and signals derived therefrom, while the circuit paths represented by dashed lines pass control signals for controlling the interaction of the various stages of the exposure time control circuit. (The automatic setting of exposure time is referred to as Automatic Setting and the manual mode of setting exposure time as Manual Setting, hereafter). 5 is a NOR circuit operative in automatic setting through which standard pulses generated from the standard pulse generating circuit 3 are permitted to pass during single pulse generated by the output of the brightness/time conversion circuit 4. 6 is a frequency dividing circuit to give inputs to reversible counter 7 which, in case of automatic setting, introduces factors for determining the time of exposure other than just the brightness of a subject at the time of memorizing. Dividing circuit 6 divides standard pulses only through the number of its preset stages enabled at the time of calling and, in case of manual setting, delivers standard pulses as inputs to the reversible counter 7 after they pass through all the divider stages. 7 is a reversible counter which adds and memorizes the number of input pulses when an additional control signal is being given by the reversible counter control circuit 14, and which in turn subtracts the memorized number of pulses by the number of input pulses when a subtraction control signal is being given by the said control circuit. 8 is a signal passage transfer circuit, provided with a plurality of control terminals which, in case of automatic setting, is employed to introduce factors for determining the time of exposure other than just the brightness of a subject and which, if a control terminal is selected which corresponds to a particular factor, delivers standard pulses to the reversible counter 7 through the required number of stages of frequency dividing circuit 6.

In case of manual setting, if a control terminal is selected according to the manual set value, it sends standard pulses divided through frequency dividing circuit 6 and reversible counter 7 from the frequency dividing circuit 6 or from the reversible counter 7 to No. 2 detection circuit. 9, 10 are memory/call-up transfer gate circuits or the circuits that transfer the route along which pulses pass at the time of memorizing and calling, and are controllable by gate control circuit 11. And, in case of manual setting which does not perform memory action, they are changed over to the pulse route at the time of calling. 11 is gate control circuit for generating signals that control the memory/call-up transfer gate circuits 9, 10. 12, 13 are auto/manual transfer gate circuits for changing pulse routes at the time of automatic and manual settings, and are controllable by auto/-manual transfer gate circuit 1. 14 is reversible counter control circuit, controllable by gate signals of control circuit 11 for giving the addition control signal or subtraction control signal to the reversible counter 7. 15 is No. 1 detection circuit that detects the point at which the memory value of reversible counter 7 becomes zero in case of automatic setting thereby generating a shutter-closing signal. 16 is No. 2 detection circuit which generates a shutter-closing signal in case of manual setting when it attains to the number of pulses corresponding with the set value so made by manual setting. 17 is shutter control circuit. 18 is delay circuit to generate a trigger pulse as timing switch SW3 is actuated. 19 is display circuit for displaying shutter speeds corresponding with the memory value memorized by reversible counter 7 in case of automatic setting.

A brief explanation is made below regarding operation of the above-described circuit. In case of automatic setting, if setting is made to automatic in the auto/-manual change-over circuit 1, then the pulse route for automatic setting is selected in auto/manual transfer gate circuits 12, 13 and when a power switch is closed by depressing the camera release, an addition control signal is given from reversible counter control circuit 14 to reversible counter 7. Simultaneously the reversible counter 7 and frequency dividing circuit 6 are then reset by reset pulses being generated by the reset pulse generating circuit 2, and also standard pulses to be generated from the standard pulse generating circuit 3 in response to the trailing edge of the reset pulse pass across NOR circuit 5 and memory/call-up change-over gate circuit 9 during the duration of the single pulse being generated from the brightness/time conversion circuit 4 and are properly divided and reduced in frequency by dividing circuit 6 under control of the signal passage transfer circuit 8 to introduce factors for determining the time of exposure other than the brightness of a subject such as informations of film sensitivity, diaphragm setting, etc. The pulses are also added or memorized by reversible counter 7 through the memory/call-up transfer gate circuit 10 and auto/manual transfer circuit 12 or they are added and memorized directly by reversible counter 7 under control of the signal passage transfer circuit 8.

The memory value so memorized controls display circuit 19 which displays shutter speeds. At the completion time of the single pulse of the brightness/time conversion circuit, gate control circuit 11 is controlled by the trailing edge of the single pulse, and memory/call-up transfer gate circuits 9, 10 are made to transfer by memory/call-up transfer signals generated in the gate control circuit 11, simultaneously controlling reversible counter control circuit 14 and giving a subtraction control signal to the reversible counter 7 to allow it to be in the state ready for controlling subtraction, thereby stopping the occurence of standard pulses of the standard pulse generating circuit 3. Operations up to this are made, in a single-lens reflex camera, before the mirror for the finder rises after the camera release button is depressed and the light falling on the photoconductive cell is interrupted. If the shutter starts opening upon further depressing of the camera release button, timing switch SW 3 is opened by shutter blade opening member (not shown) and a trigger pulse is generated by delay circuit 18 after an elapse of a definite time, and by means of which standard pulses are generated again in the standard pulse generating circuit 3, and also the shutter speeds being displayed by the display circuit 19 are reset. The standard pulses generated again pass along the memory/call-up transfer gate circuit 9, and after being divided by frequency dividing circuit 6, are given as inputs to reversible counter 7 through memory/call-up transfer gate circuit 10 and auto/manual transfer gate circuit 12, where they subtract the memory content of the counter 7. When the memory value becomes zero, then the No. 1 detection circuit 15 detects this condition. The shutter closing signal produced in the No. 1 detection circuit 15 controls shutter control circuit 17, interrupts the current of electromagnet Mg locking the shutter blade closing member (not shown) and releases the shutter blade closing member, thus closing the shutter.

In case of manual setting, auto/manual transfer circuits 12, 13 are transfered to the pulse route for manual setting upon selection of a manual set exposure value, and reversible counter 7 is then connected to the last stage of frequency dividing circuit 6. The standard pulses to be generated in the standard pulse generating circuit 3 are delivered as inputs to reversible counter 7 after passing through all stages of the frequency dividing circuit 6. Display circuit 19 is constructed so that no display is made at the time of manual setting as described later. If a power switch is closed by depressing the camera release, reversible counter control circuit 14 gives an addition control signal to the reversible counter 7 in the same way as in automatic setting, then reversible counter 7 and frequency dividing circuit 6 are reset by a reset pulse generated by the reset pulse generating circuit 2. The brightness/time conversion circuit 4 becomes a signal level concurrent with a supply of power at the completion time of single pulses in case of automatic setting, and gate control circuit 11 is controlled by this signal, transfering the memory/call-up transfer circuits 9, 10 by the memory/call-up transfer signal generated in the gate control circuit 11 and thus holding the state for addition control while simultaneously controlling the reversible counter control circuit 14. Then, the mirror for the finder goes up by depressing the camera release more and the shutter starts opening with timing switch SW3 actuated to open, and a trigger pulse is then generated after a definite delay time determined by delay circuit 18, by means of which standard pulses are generated in the standard pulse generating circuit 3. The standard pulses thus generated are given as inputs to frequency dividing circuit 6 by way of the memory/call-up transfer gate circuit 9, and after passing through all of the stages of the frequency dividing circuit 6, they are delivered as inputs through auto/manual transfer gate circuit 12 to reversible counter 7, where they are divided. The standard pulses thus divided are then sent to No. 2 detection circuit 16 by the control terminal selected according to the manual set value, thereby transmitting a shutter-closing signal to the shutter control circuit 17, which in turn cuts off the current of electromagnet Mg, thereby closing the shutter.

Figure 2A:
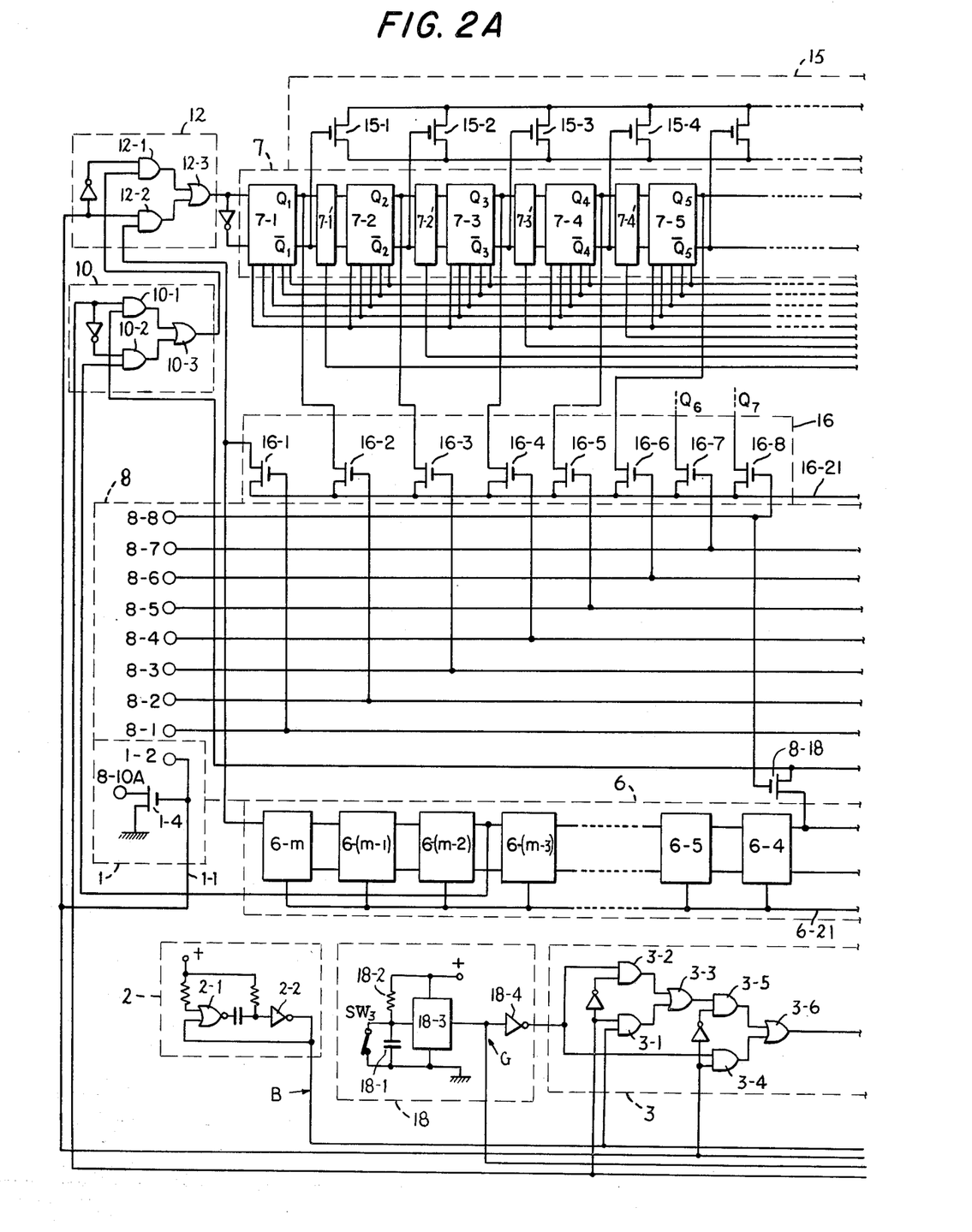
FIG. 2 shows an embodiment of the above-said block diagram.
Figure 2B:
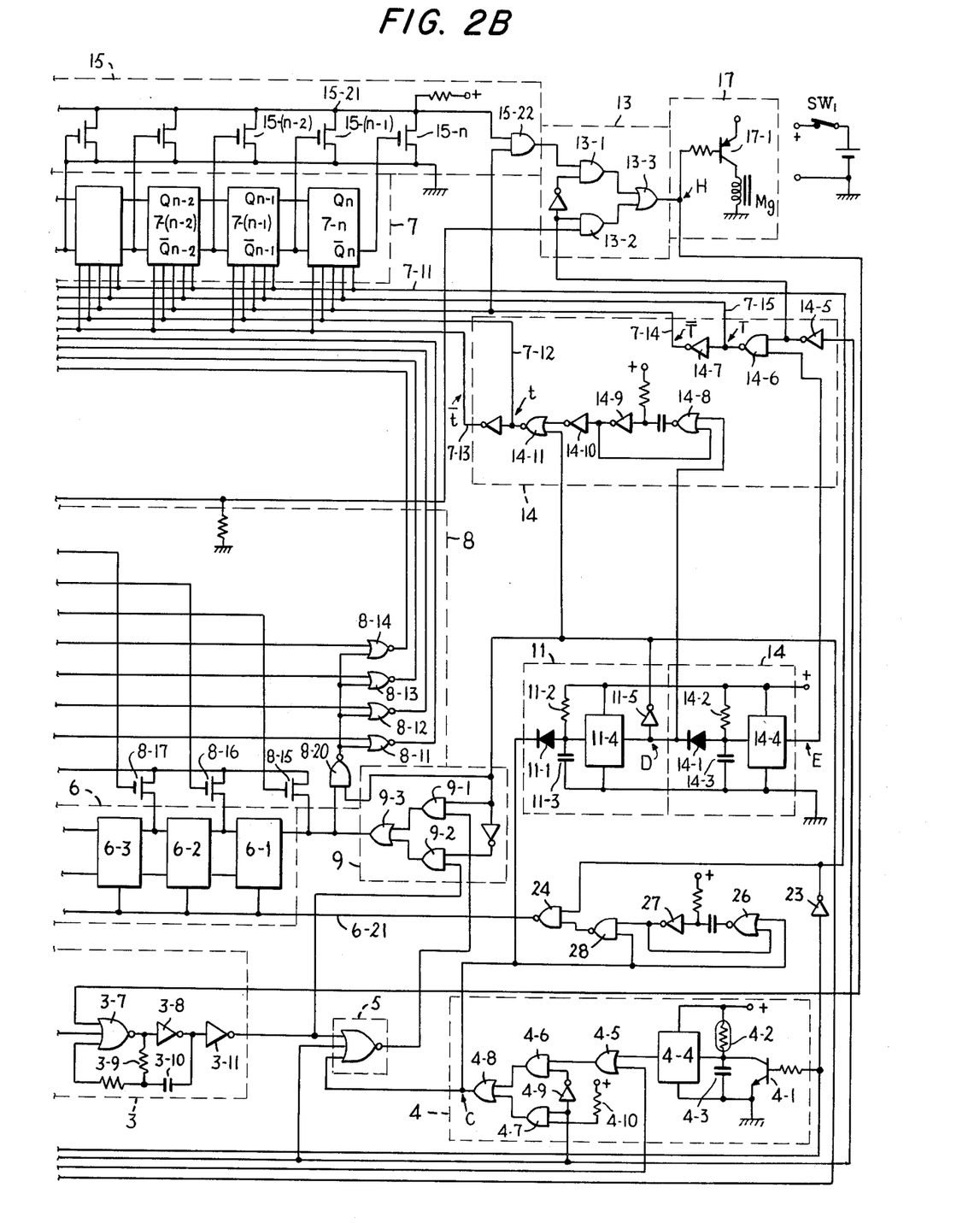

FIG. 2 illustrates an embodiment of the circuitry represented by the respective blocks illustrated in FIG. 1. The display circuit 19 will be explained later. The present invention is to be described according to FIG. 2. 1 as used in the sentences hereunder will be referred to as a high level of signal level and 0 therein will imply the low signal level. If power switch SW1 is closed for a power supply at the early stage of camera release operations, 0 signal is given to the control line 1—1 by auto/manual transfer circuit 1 in the case of automatic setting as will be explained later, and simultaneously, the output point G of delay circuit 18, the output point C of brightness/time conversion circuit 4, the output point D of gate control circuit 11 and the output point E of reversible counter control circuit 14 will become 0. And the input end H of shutter control circuit 17 becomes 0, thereby exciting the electromagnet Mg of shutter control circuit 17 while 0 signal at the output point E of reversible counter control circuit 14 is sent to addition control line 7-15 allowing signal T to be 1 through the NAND circuit 14-6. One input terminal of NAND circuit 14-6 is connected to the control line 1—1 by way of inverter 14-5 thus making the reversible counter 7 ready for controlling addition operations. Meanwhile, reset pulse generating circuit 2 causes positive reset pulses to be developed at the output point B of inverter 2—2 by the mono-stable multivibrator consisting of NOR circuit 2-1, inverter 2—2, etc. in synchronism with a supply of power. While the output point B is 1, the output of inverter 23 is 0 and is sent to the reset line 7-11 of reversible counter 7, making the reversible counter 7 reset. Then, the output of inverter 23 further passes along NAND circuit 24 and is 1 and is sent to the reset line 6-21 of frequency dividing circuit 6, resetting the frequency dividing circuit 6. (Resetting is effected when reversible counter 7 is 0 and frequency dividing circuit 6 is 1). Since the output point B is then 1, the transistor 4-1 of brightness/time conversion circuit 4 will be rendered conductive and condenser 4-3 will not be charged. And also, a 1 signal at the output point B is delivered as an input through the AND circuit 3-1, OR circuit 3-3, AND circuit 3-5 and OR circuit 3-6 of the standard pulse generating circuit 3 to NOR circuit 3-7. The pulse generating unit for standard pulse generating circuit 3 is a well-known pulse generating circuit comprised of NOR circuit 3-7, inverter 3-8, resistor 3-9, condenser 3-10, etc. and as 1 signal is applied as an input to NOR circuit 3-7, and the pulse generating unit will not generate pulses.

Figure 3:
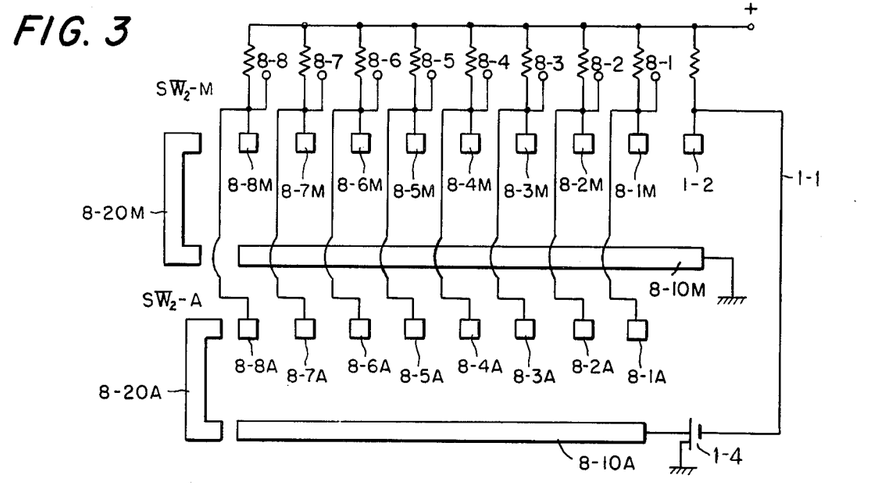
FIG. 3 shows change-over switches, etc. in the said embodiment.

Next, the output B becomes 0 at the end of the reset pulse whereby the transistor 4-1 of brightness/time conversion circuit 4 is interrupted so that condenser 4-3 starts charging through photoconductive cell 4-2. At the same time, a 0 signal at output point B is applied as an input to the NOR circuit 3-7 of the pulse generating unit through the NAND circuit 3-1, OR circuit 3-3, AND circuit 3-5 and OR circuit 3-6 of standard pulse generating circuit 3, thus starting generation of standard pulses. The standard pulses thus generated pass the AND circuit 9-1 and OR circuit 9-3 of memory/call-up transfer gate circuit 9 by way of inverter 3-11 and NOR circuit 5. Signal passage transfer circuit 8 has a plurality of control terminals (8-1, 8-2, - - - 8-8), which are respectively connected to the contacts of change-over switch SW2 as shown in FIG. 3. As described later, if one of the contacts of change-over switch SW2 as shown in FIG. 3 is selected corresponding with film sensitivity, diaphragm setting information, etc., the signal level of the control terminal connected thereto will become 0, and the switching elements controllable by the control terminal (8-15, — 8-18, 16-1, 16-2 — 16-8) or NOR circuit (8-11 — 8-14) will be rendered conductive thus permitting signals to pass. If the terminal 8-5 is selected to be 0, for example, switching elements 8-15, 16-5 are rendered conductive and standard pulses passed the OR circuit 9-3 of memory/call-up transfer circuit 9 then pass across through the AND circuit 10-1, OR circuit 10-3 of memory/call-up transfer circuit 10 through the switching element 8-15, further through the AND circuit 12-1, OR circuit 12-3 of auto/manual transfer gate circuit 12, and they are delivered as inputs to the reversible counter 7 (pulses which pass the switching element 16-5 will be described later).

Reversible counter 7 is comprised of the flip-flop counting stages 7-1, 7-2, 7-3, - - - 7-n connected in cascade and the terminals Q1, Q2, Q3, - - - Qn of respective counting stages are connected to the gate terminals of switching elements 15-1, 15-2, 15-3, - - - 15-n of No. 1 detection circuit 15. If the number of pulses given as inputs is memorized in the reversible counter 7, at least one of the terminals Q1, Q2, Q3 - - - Qn is 0, and therefore, the gate terminal of corresponding switching element of detection circuit 15 becomes 0 continuously, and automatic detection line 15-21 also becomes 0. Next, if the condenser 4-3 of brightness/time conversion circuit 4 reaches a certain required level of charging voltage, the output of switching circuit 4-4 is then inverted from 0 to 1. The time taken here from the interception of transistor 4-1 to the inversion of the output of switching circuit 4—4 from 0 to 1 depends upon the resistance value of photoconductive cell 4-2 which is subject to change in accordance with the brightness of a subject and the capacity of condenser 4-4, and hence, if the brightness of a subject is high it is short and when the brightness of a subject is low it is long. Since the output of OR circuit 4-5 one input of which receives 0 from output point G of the switching circuit 18-3 for delay circuit 18 is to become 1 by inversion of the output of switching circuit 4-4 and the output point C is made to be 1 through AND circuit 4-6, OR circuit 4-8, NOR circuit 5 is then intercepted and standard pulses generated from the standard pulse generating circuit are no longer sent to reversible counter 7. At another input of AND circuit 4-6 the 0 signal of control line 1-1 is applied through inverter 4-9. And because the output point C of brightness/time conversion circuit 4 is inverted to 1 the mono-stable multivibrator made up of NOR circuit 26, inverter 27, etc. is triggered, and single pulses generated therefrom are sent through NAND circuits 28, 24 to reset line 6-21 again resetting frequency dividing circuit 6. Simultaneously, the diode 11-1 of gate control circuit 11 is intercepted, charging of condenser 11-3 is then started, and when the charging voltage reaches the required level the output point D of switching circuit 11-4 is inverted from 0 to 1. This 1 signal is then sent through inverter 11-5 to memory/call-up transfer gate circuits 9, 10, providing a 0 signal to AND circuits 9-1, 10-1 and also giving a 0 signal to the AND circuit 3-1 of standard pulse generating circuit 3.

Since the input signal of AND circuit 3-2 is also caused to be 1, a 1 signal is applied as an input through OR circuit 3-3, AND circuit 3-5, and OR circuit 3-6 to NOR circuit 3-7, thereby stopping oscillation. Moreover, an inversion of output point D of switching circuit 11-4 triggers the mono-stable multi-vibrator consisting of NOR circuit 14-8, inverter 14-9, etc., thus allowing a single pulse to be generated, and a positive single pulse generated is then sent through inverter 14-10, NOR circuit 14-11 to the transfer control lines 7-12, 7-13 of reversible counter 7 thereby making the transfer control signals t change to 1 and t to 0 for a short while. Simultaneous with generation of the single pulse, diode 14-1 is intercepted by inversion of the output point D of switching circuit 11-4, and consequently, condenser 14-3 starts charging, and when its charging voltage reaches a required level, the output point E of switching circuit 14-4 is inverted from 0 to 1, which is in turn sent through NAND circuit 14-6 to subtraction control line 7-14 making subtraction control signal T 1, thereby allowing the reversible counter 7 to be ready for controlling subtraction. After the reversible counter 7 was shifted from the state of controlling addition to that capable of controlling subtraction by inversion of the output point E of switching circuit 14-4, single pulse generated from the mono-stable multivibrator composed of NOR circuit 14-8, inverter 14-9, etc. is ended, and $t$ is 0 and $t$ is 1.

The transfer control signals $t, t$ referred to herein are used to prevent any change of memory values of the reversible counter 7 at the time when addition control signal T and subtraction control signal T are switch. At the last stage of the release operation the shutter opens and starts moving. Then timing switch SW is opened by the shutter blade opening member and delay circuit 18 starts actuating, and after a delay of a given time output point G is inverted from 0 to 1, and a 0 signal passes the AND circuit 3-2, OR circuit 3-3 of standard pulse generating circuit 3 by way of inverter 18-4, and also through AND circuit 3-5, OR circuit 3-6, it is transmitted to NOR circuit 3-7, thereby starting generation of standard pulses again. The standard pulses thus produced are then applied as inputs through inverter 3-11, the AND circuit 9-2, OR circuit 9-3 of memory/call-up transfer gate circuit 9 to the frequency dividing circuit 6. The standard pulses delivered into the frequency dividing circuit 6 are divided one after another by frequency dividing stages 6-1, 6-2 - - - 6-(m-3) and taken out of the output of the frequency dividing stage 6-(m-3) and then applied as inputs through AND circuit 10-2, OR circuit 10-3 of memory/call-up transfer gate circuit 10 and through auto/manual transfer gate circuit 12 to the reversible counter 7. The number of pulses memorized in the reversible counter 7 at the time of memorizing is subtracted in turn by the input pulses divided by frequency dividing circuit 6, and when the memory value becomes zero, all the outputs Q1, Q2, Q3 - - - Qn of respective stages of the reversible counter 7 become 1, and therefore, the gate terminals of all switching elements 15-1, 15-2, 15-3, - - - 15-n of No. 1 detection circuit 15 become 1, being in the state of interception. Since the input of AND circuit 15-22 of No. 1 detection circuit 15 also becomes 1, its output accordingly becomes 1 and is delivered as an input through AND circuit 13-1, OR circuit 13-3 to the transistor 17-1 of shutter control circuit 17. Then, it intercepts the current of electromagnet Mg locking the shutter blade closing member and releases the shutter blade closing member, thereby closing the shutter. An inversion of output point H of OR circuit 13-3 from 0 to 1 is delivered as an input to the NOR circuit 3-7 of standard pulse generating circuit 3 and generation of standard pulses is made to stop again.

Here, an explanation is given of the function of the OR circuit 4-5 of the brightness/time conversion circuit 4. Where the brightness of a subject is low, for example, if the time taken for inverting the output of switching circuit 4-4 from 0 to 1 after interruption of transistor 4-1 is long, it is liable to cause a mistake in handling of the camera such that the shutter button is pushed down causing the mirror to rise even when memorizing is incomplete. As the light passed through a photographing lens is no longer emitted into the light-receiving element in this case, the output of switching circuit 4-4 still remains 0, without being inverted to 1. As has been mentioned above, however, this system is arranged to actuate gate control circuit 12 and reversible counter control circuit 14, etc. through an inversion of this output from 0 to 1 thereby transfering memory action to calling action, and it will perform memory action where this output is not inverted and will not effect calling action despite starting of exposure, whereby it is incapable of terminating exposure. For this reason, the present invention delivers an output signal G of delay circuit 18 to operate upon timing switch SW3 as input to OR circuit 4-5 after actuation of the said timing switch and even when the output of switching circuit 4-4 is not inverted to 1, it applied 1 signal output to the output of OR circuit 4-5 only if timing switch SW3 is actuated in the same manner as the case in which the output of switching circuit 4-4 is inverted, whereby a condition is avoided wherein the camera will not complete exposure when handled erroneously as mentioned above. Of course, the most appropriate exposure is achieved as mentioned above if the output of switching circuit 4-4 is inverted from 0 to 1 earlier than the output G of switching circuit 18-3. Accordingly, most appropriate exposure is achieved both in normal and erroneous handlings of the camera because the generating time of two signals is compared and the system is controlled by either one of the signals occurring ahead of each other. Besides, subtracting the number of pulses memorized after standard pulses generated in the standard pulse generating circuit 3 are divided at the time of calling is intended to obtain an appropriate exposure time in which frequency at the time of memorizing is made high to shorten the memory time and frequency at the time of calling is made low by dividing because the time available for memory before the mirror goes up is short. Next, an explanation is given to the case of manual setting.

After a manual set value of exposure time is selected, as described above, power switch SW1 is closed at the early stage of the release operation of the camera, current is then supplied and a 1 signal is sent to respective circuits through control line 1-1 to make the whole system ready for manual setting, and similarly as in automatic setting, the output point G of delay circuit 18 becomes 0. And the output point C of brightness/time conversion circuit 4 becomes 1 as the 1 signal of control line 1-1 is applied as an input through AND circuit 4-7 to OR circuit 4-8 and a 1 signal is delivered as an input to NOR circuit 5. Consequently NOR circuit 5 is intercepted. Moreover, the input H of shutter control circuit 17 becomes 0 thereby exciting electromagnet Mg through transistor 17-1. Since the 1 signal of control line 1-1 is then applied as an input to one side of the input terminal of NAND circuit 14-6 for reversible counter control circuit 14 by way of inverter 14-5, the output level is fixed at 1, and does not depend upon the output signal of switching circuit 14-4 being the same state as the other side input terminal. Accordingly, the reversible counter 7 is maintained in the state of controlling addition operations. Similarly as in automatic setting, the reset pulses generated from the reset pulse generating circuit 2 reset the reversible counter 7 and the frequency dividing circuit 6 and then allow the transistor 4-1 of brightness/time conversion circuit 4 to be rendered nonconductive by the trailing edge of reset pulse so that condenser 4-3 starts charging. One input of AND circuit 4-6 receives 0, however, the output point C of OR circuit 4-8 remains 1 despite the output signals of switching circuit 4-4. Then, the signal of output point B being 0 at the completion time of reset pulses is delivered as an input through the AND circuit 3-1, OR circuit 3-3, AND circuit 3-5 of the standard pulse generating circuit 3 to OR circuit 3-6. Because the output end of AND circuit 3-4 4 is 1, however, the output end of OR circuit 3-6 becomes 1, and hence no standard pulses will be generated. And also, 1 a signal of output point C of the brightness/time conversion circuit 4 makes the diode 11-1 of gate control circuit 11 nonconductive. As a result, if the output level of switching circuit 11-4 is inverted from 0 to 1, similar to the case of automatic setting, transfer control signals t, t are inverted by the said inversion, and after an elapse of a definite time, t, t are inverted again, during which the output level of switching circuit 14-4 for reversible counter control circuit 14 is also inverted. As described above, however, the addition control signal T of reversible counter 7 is not inverted because of NAND circuit 14-6, and the reversible counter 7 will be held in the state of controlling addition.

Next, similarly as in the case of automatic setting, timing switch SW3 opens after shutter actuation is started and the output point G of delay circuit 18 is inverted from 0 to 1, which is then changed to 0 and applied as an input through inverter 18-4 to the AND circuit 3-4 of standard pulse generating circuit 3. And, a 0 signal is delivered as an input through OR circuit 3-6 to NOR circuit 3-7, thereby starting generation of standard pulses. The standard pulses thus generated are applied as inputs to frequency dividing circuit 6 via the AND circuit 9-2, OR circuit 9-3 of memory/call-up transfer gate circuit 9. The divided pulses passing all the dividing stages of frequency dividing circuit 6 are given as inputs through the AND circuit 12-2, OR circuit 12-3 of auto/manual transfer gate circuit 12 to reversible counter 7, where they are divided. At this time, all the routes in the signal passage transfer circuit 8 through which pulses pass are cut off by NAND circuit 8-20, AND circuit 10-1 controllable by signals of gate control circuit 11, and one of the control terminals (8-1, 8-2, — 8-8) of the signal passage transfer circuit 8 is also selected to conform with the manually set value. Therefore, if the terminal 8-5 is selected, for example, switching elements 8-15, 16-5 become conductive, but the pulses passing the switching element 8-15 are cut off by the AND circuit 10-1 of memory/call-up transfer gate circuit 10 as mentioned above. Then, the pulses which pass the OR circuit 9-3 of the memory/call-up transfer gate circuit 9 and are divided one after another by the frequency dividing stages 6-1 6-2, — 6-m of frequency dividing circuit 6 are further applied as inputs to the counting stage 7-1 of reversible counter 7. After they are divided in turn, the output point Q4 of counting stage 7-4, 4, becomes 1, and this 1 signal is then sent through the switching element 16-5 to manual detection line 16-21 and delivered as an input to the AND circuit 13-2 of auto/manual transfer gate circuit 13, allowing the output point H of OR circuit 13-3 to be inverted from 0 to 1 thus applying 1 signal to the transistor 17-1 of shutter control circuit 17, and demagnetizing electromagnet Mg, thereby closing the shutter. Since the NOR circuit 3-7 of standard pulse generating circuit 3 receives a 1 signal as an input by inversion of the output point H from 0 to 1, generation off the standard pulses will stop.

Figure 7:
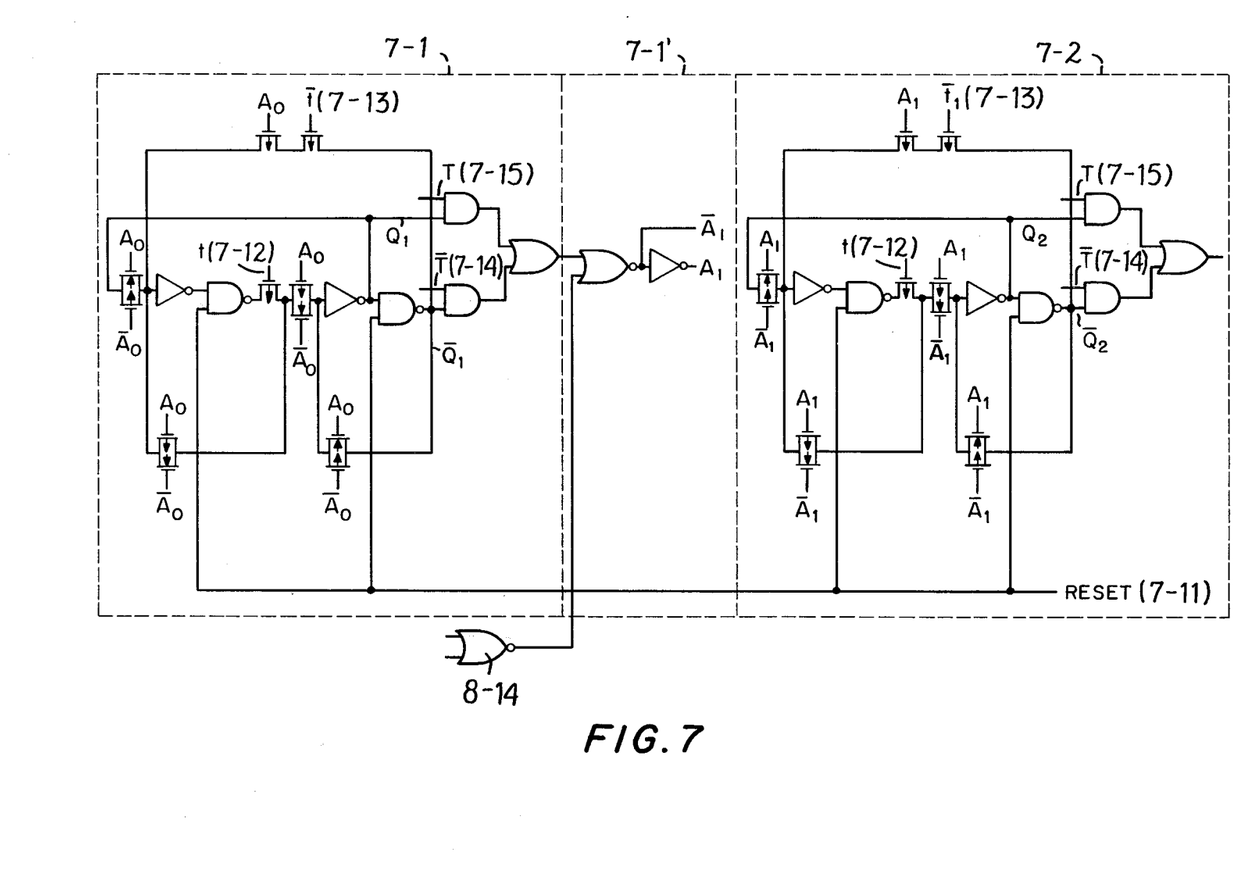
FIG. 7 illustrates the structure of gate circuits included in a reversible counter included in the circuit shown in FIG. 1.

FIG. 3 shows change-over switch SW2 for use in selecting the control terminals 8-1, 8-2 - - - 8-7, 8-8 of signal passage transfer circuit 8. The change-over switch SW2-A is a switch for introducing determinant factors other than the brightness of a subject in case of automatic setting and change-over switch SW2-M is a switch for determining the time of exposure in case of manual setting. An explanation is given concerning operation of the change-over switch SW2 using FIG. 2. The change-over switch SW2-A is composed of common contact piece 8–10A, movable contact piece 8-20A and terminals 8-1A, 8-2A - - - 8-7A, 8-8A. The movable contact piece 8-20A is moved by the coupling unit connected to both the diaphragm ring and film sensitivity setting ring attached on the camera. And, the change-over switch SW2-M consists of common contact piece 8-10M with grounding connection, movable contact piece 8-20M and terminals 8-1M, 8-2M, - - - 8-7M, 8-8M, and as shown in the Figure, the terminals 8-1A, and 8-1M, 8-2A and 8-2 M - - - 8-8A and 8-8M are short-circuited. The control terminals 8-1, 8-2, - - - 8-8 of signal passage transfer circuit 8 as shown in FIG. 2 are connected to 8-1A, 8-2A - - - 8-8A of these terminals respectively. The change-over switch SW2-M is also provided with terminal 1-2, and it moves the movable contact piece 8-20M to the terminal 1-2 by auto/manual photographing transfer ring in case of automatic setting of exposure time. If the movable contact piece 8-20M is short-circuited to terminal 1-2 and common contact piece 8-10M, control line 1-1 is to receives a 0 signal, and P channel field transistor 1-4 (referred to as FET hereunder) will be brought to conductivity thus allowing the common contact piece 8-10A of change-over switch SW2-A to be 0. Accordingly, the terminal short-circuited to the common contact piece 8-10A by the movable contact piece 8-20A of change-over switch SW2-A becomes 0 and the corresponding control terminal becomes 0. Since the control line 1-1 is 0 in this case, respective circuits are actuated for automatic setting. Therefore, by properly changing the movable contact piece 8-20A of change-over switch SW2-A, determinant factors for the time of exposure other than the brightness of a subject, for instance, film sensitivity, diaphragm informations can be introduced. Now, assume that the movable contact piece 8-20A of SW2-A is moved to terminal 8-5A and this is determined as the position of ASA 100 F11, and that the number of standard pulses to pass the NOR circuit 5 and also the switching element 8-15 during the pulse developed pulse width obtainable by the brightness/time conversion circuit 4 was 8, then 8 pulses would be applied as inputs to the reversible counter 7 and the output Q4 of counting stage 7-4 would be inverted. Moreover, if terminal 8-4A and common contact piece 8-10A are short-circuited by movable contact piece 8-20A where setting is made to ASA 100, F16, 8 standard pulses generated from the standard pulse generating circuit 3 are delivered as inputs through NAND circuit 8-20, NOR circuit 8-14 to the gate 7-1 between the counting stages 7-1 and 7-2 of reversible counter 7. The structure of each of the gates 7-1 . . . 7-4' is illustrated in FIG. 7. This structure is known as is disclosed in applicant's copending application Ser. No. 499,995, filed Aug. 23, 1974. Then, as counting stage 7-5 is inverted, reversible counter 7 would substantially have inputs equivalent to 16 applied pulses. And, if terminal 8-6 A and common contact piece 8-10A are short-circuited by movable contact piece 8-20A and control terminal 8-6 becomes 0 assuming that setting is made to ASA 200 F11, 8 standard pulses generated from the standard pulse generating circuit 3 would pass switching element 8-16 after being divided by the dividing stage 6-1 of frequency dividing circuit 6 and would be applied as inputs to reversible counter 7 by way of memory/call-up transfer gate circuit 10 and auto/manual transfer gate circuit 12. The counting stage 7-3 is then inverted and 4 ea pulses are to be memorized. If the memory value thus memorized is subtracted by the pulses with a definite frequency, the time of exposure during which terminals 8-4A, 8-3A, 8-2A - - - are short-circuited to be 0 will 2, 4, 8 - - - times by transfer of change-over switch SW2-A inspite of the same brightness of a subject, provided that the time of exposure when terminal 8-5A is selected is 1. And, the time of exposure in case terminals 8-6A, 8-7A - - - are short-circuited to 0 will be ½, ¼ —, thus, film sensitivity and diaphragm information in a multiple system can be introduced. Next, if the movable contact piece 8-20M of change-over switch SW2-M is changed from terminal 1-2 to any other terminal, control line 1—1 becomes 1, and FET 1-4 is cut off thereby controlling respective circuits so as to be in the state of manual setting, and at the same time common contact piece 8-10A is made to 1. Now, suppose the terminal 8-2M of change-over switch SW2-M is made 0 by movable contact piece 8-20M standard pulses generated from the standard pulse generating circuit 3 are divided in turn through the dividing stages 6-1, 6-2, - - - 6-m of frequency dividing circuit 6 as mentioned above, and are applied as inputs to the counting stage 7-1 of reversible counter 7, thereby counting stage 7-1 is inverted. This is then sent to manual detection line 16-21 by way of the switching element 16-2 of No. 2 detection circuit 16, and thus the time of exposure is controlled.

Figure 4:
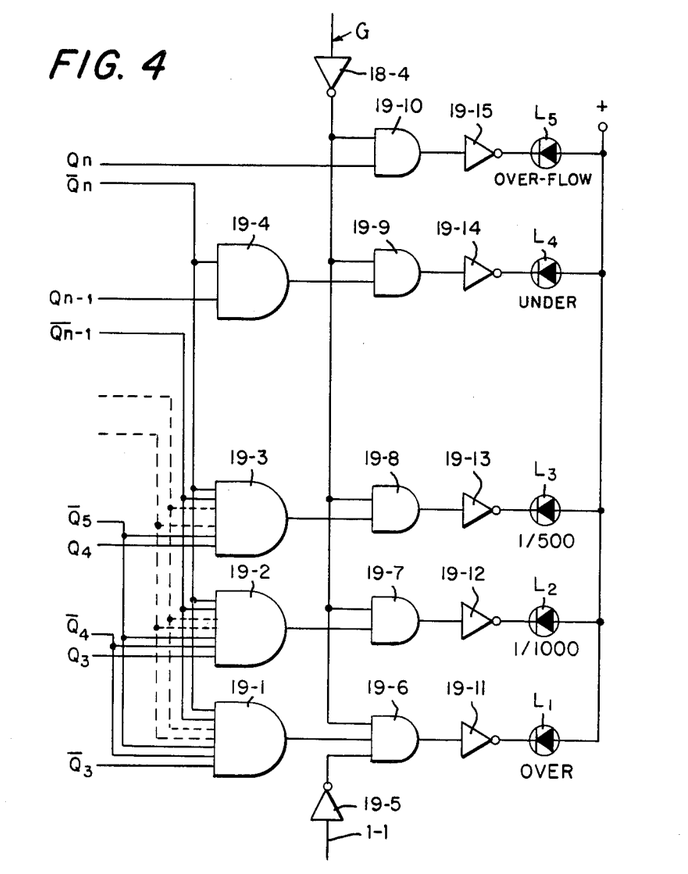
FIG. 4 shows an embodiment of a display circuit in the said block diagram.

FIG. 4 is one embodiment of display circuit 19 for shutter speeds. An explanation of the operation is made using FIG. 2. The input terminals of AND circuits 19-1, 19-2, 19-3, 19-4 are connected to the terminals Q3, Q3, Q4, Q4, Q5 - - - Qn-1, Qn of respective counting stages of reversible counter 7 as illustrated in FIG. 2 and the outputs of respective AND circuits 19-1, 19-2, 19-3 19-4 are applied as inputs to AND circuits 9-6, 19-7, 19-8, 19-9, and the terminal Qn for the last stage of reversible counter 7 is connected to the input of AND circuit 19-10. The outputs of AND circuits 19-6, 19-7, 19-8, 19-9, 19-10 are connected to inverters 19-11, 19-12, 19-13, 19-14 and 19-15, to the outputs of which are connected as shown the display elements L1, L2, L3, L4, L5 consisting of light emitting diodes. Control line 1-1 is also connected through inverter 19-5 to AND circuit 19-6. Operation of the display elements are in such a way that L1 is lighted for OVER display, to show overexposure, 12 is lighted for 1/1000 S display, L3 is lighted for 1/500 S display, L4 is lighted for UNDER display to show hand vibration and L5 is lighted for OVERFLOW to show the limits of exposure. The signals of output point G for delay circuit 18 are delivered as inputs to other input terminals of AND circuits 19-6, 19-7, 19-8, 19-9 and 19-10 through inverter 18-4. An explanation of the actuation of this display circuit 19 follows. By depressing release button in case of automatic setting, 0 signal is applied to control line 1-1 as set forth above and all Q1, Q2, Q3, Q4 - - - Qn become 1 and all Q1, Q2, Q3, Q4 - - - Qn become 0 when reversible counter 7 is reset. Consequently the output of AND circuit 19-1 becomes 1 and the outputs of AND circuits 19-2, 19-3, 19-4, 19-10 become 0. Meanwhile, timing switch SW3 is still being closed and the output point G of delay circuit 18 is 0 and a 1 signal is applied as an input to AND circuits 19-6, 19-7, 19-8, 19-9 and 19-10 through inverter 18-4. So only the output of AND circuit 19-6 becomes 1 and the output of inverter 19-11 becomes 0, thereby L1 is lighted displaying OVER, while other display elements L2, L3, L4 and L5 are not lighted. Now assume 4 pulses are given to reversible counter 7, by which 1/1000 S is obtained for the time of exposure. Then, Q3 level 1, and Q3 becomes 0. As a result, the output of AND circuit 19-2 becomes 1 and the output of AND circuit 19-7 also becomes 1, and then the output of inverter 19-2 becomes 0, thereby L2 is lighted displaying 1/1000 S. Since Q3 of AND circuit 19-1 receives a 0 signal in this case, the output of AND circuit 19-1 becomes 0, thereby allowing L1 to go out. If 8 pulses are delivered as inputs to reversible counter 7, Q4 level becomes 1 and Q4 0, and hence, only the output end of AND circuit 19-8 becomes 1, thus allowing L3 to be lighted for display of 1/500 S. Similarly, shutter speed is displayed corresponding with the number of pulses to be given an input to reversible counter 7, and if pulses are given as inputs to the last stage 7-n of reversible counter 7, L5 is lighted displaying OVERFLOW. Furthermore, if the output point G of delay circuit 18 is inverted from 0 to 1 after timing switch SW3 is opened interlocking with camera release operations, the signals generated are given as inputs through inverter 18-4 to AND circuits 19-6, 19-7 19-8 19-9 and 19-10 Consequently all these output points of the respective AND circuits become 0 thereby putting out the light emitting diodes which are then lighted. In case of manual setting, since the reversible counter 7 is reset until the output point G of delay circuit 18 is inverted after opening of timing switch SW3, only the output of AND circuit 19-1 for display circuit 19 is 1. Although this 1 signal is given as an input to AND circuit 19-6, control line 1-1 is also at the input state with AND circuit 19-6 by way of inverter 19-5, and as the control line 1-1 is 1 at the time of manual setting as described above, the output of AND circuit 19-6 is 0, and therefore, all light emitting diodes will not be lighted.

Figure 5:
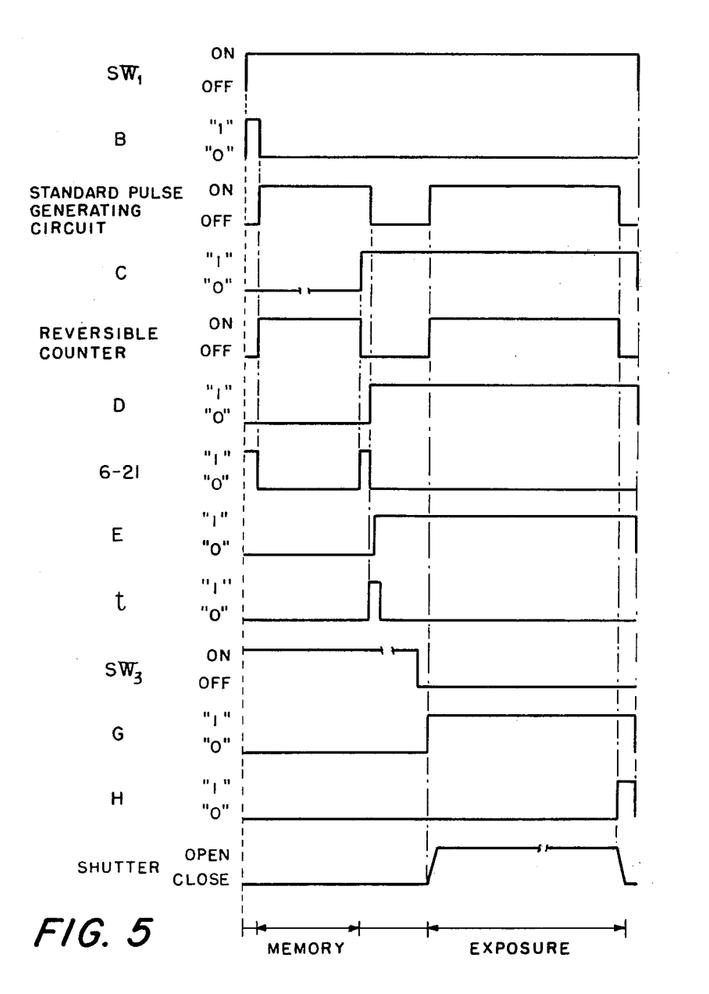
FIG. 5 and FIG. 6 are timing diagrams showing the actuating state and signal levels relative to respective switches, circuits, signals, etc. in the said embodiments.
Figure 6:
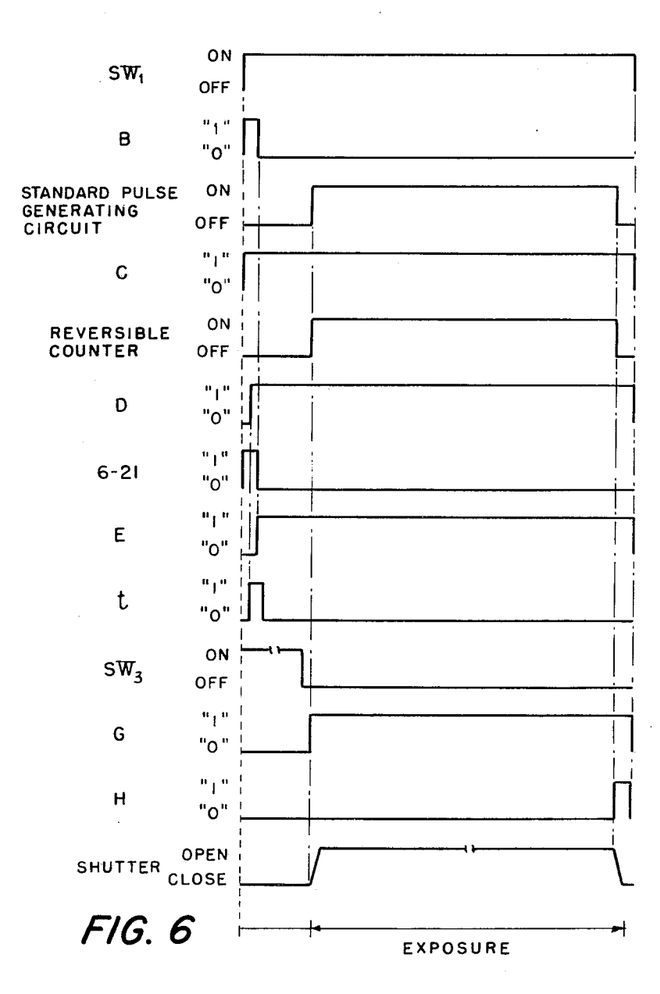

FIG. 5 is timing diagram showing the actuating state and signal levels relative to respective switches, circuits, control terminals, shutter, etc. in case of automatic setting and FIG. 6 shows the same in case of manual setting. B,C, D, E, G, H show signal levels at respective points of B, C, D, E, G, H in FIG. 2.

As explained above, according to the present invention, the completion time of the single pulses generated in the brightness/time conversion circuit and the generating time of a trigger pulse produced by actuation of the timing switch are detected by comparison, and memory action is stopped by either one of the signals. Therefore, it is possible to eliminate defective operation in which memory action is carried out while exposure is being made. Thus, it has a big advantage of achieving the appropriate exposure action in spite of any abnormal handling of the camera.

I claim:

1. In an exposure time control circuit of the type including a reversible counter operable in an addition mode for counting a number of pulses representative of an exposure time, and in a subtraction mode for reading-out the counted pulses for controlling the exposure time; a pulse generator for generating standard pulses at a certain rate; a brightness/time conversion circuit responsive to the brightness of a scene to be photographed for developing a single pulse having a duration proportional to the exposure time; and means for applying standard pulses to said counting circuit to count standard pulses for the duration of the pulse proportional to the exposure time and for switching said counting circuit to the subtraction mode upon the completion of the pulse proportional to the exposure time; the improvement which comprises: said means for applying including control means responsive to the completion of the pulse proportional to the exposure time and responsive to a shutter opening trigger pulse for switching said counting circuit to the subtraction mode upon the occurrence of either, whereby the exposure time control circuit is operative for controlling exposure time if the shutter opening trigger pulse occurs before the pulse proportional to the exposure time is terminated.

* * * * *